(12) United States Patent
Arlinghaus

(10) Patent No.: US 11,376,636 B2
(45) Date of Patent: Jul. 5, 2022

(54) METHOD OF PRODUCING GLUTEN FREE OATS THROUGH HYPERSPECTRAL IMAGING

(71) Applicant: General Mills, Inc., Minneapolis, MN (US)

(72) Inventor: Mark E Arlinghaus, Minneapolis, MN (US)

(73) Assignee: General Mills, Inc., Minneapolis, MN (US)

( * ) Notice: Subject to any disclaimer, the term of this patent is extended or adjusted under 35 U.S.C. 154(b) by 639 days.

(21) Appl. No.: 16/105,136

(22) Filed: Aug. 20, 2018

(65) Prior Publication Data

US 2020/0055093 A1   Feb. 20, 2020

(51) Int. Cl.
  *B07C 5/342*   (2006.01)
  *A23L 5/20*    (2016.01)
  *A23L 7/10*    (2016.01)

(52) U.S. Cl.
  CPC .............. *B07C 5/3425* (2013.01); *A23L 5/20* (2016.08); *A23L 7/197* (2016.08); *A23V 2002/00* (2013.01); *B07C 2501/0081* (2013.01)

(58) Field of Classification Search
  CPC .......... B07C 5/3425; G01N 2021/1706; G01N 2021/8592; G01J 3/24
  See application file for complete search history.

(56) References Cited

U.S. PATENT DOCUMENTS

| | | |
|---|---|---|
| 4,260,262 A | 4/1981 | Webster |
| 5,638,961 A | 6/1997 | Satake et al. |
| 5,761,070 A | 6/1998 | Conners et al. |
| 5,779,058 A | 7/1998 | Satake et al. |
| 5,991,025 A | 11/1999 | Wright et al. |

(Continued)

FOREIGN PATENT DOCUMENTS

WO   WO 2007/068056   6/2007

OTHER PUBLICATIONS

Mohan et al., "Classification of Bulk Cereals Using Visible and NIR Reflectance Characteristics", Canadian Biosystems Engineering, vol. 47, pp. 7.7-7.14, 2005.

(Continued)

*Primary Examiner* — Michael McCullough
*Assistant Examiner* — Kalyanavenkateshware Kumar
(74) *Attorney, Agent, or Firm* — Diederiks & Whitelaw, PLC; John L. Crimmins, Esq.

(57) ABSTRACT

A method of producing gluten-free oats from a supply of grains incorporating oats and at least one contaminant grain includes hyperspectral imaging and analyzing data of only a particular region of interest of each grain in the supply of grains, particularly excluding tip and peripheral edge regions of the grain. Therefore, the particular regions of interest is limited to a central region of each grain determined by locating a centroid of the grain and collecting data of the grain from only pixels in a predetermined spacing from the centroid. Preferably, the hyperspectral imaging is only performed in wavelengths ranging from 1000 to 2500 nm. The method can be particularly employed in connection with quality control sampling of a pre-sorted supply of gluten-free oats to assure a gluten level well below 20 ppm, preferably a gluten level of no greater than 10 ppm.

24 Claims, 2 Drawing Sheets

(56) References Cited

U.S. PATENT DOCUMENTS

| | | | |
|---|---|---|---|
| 6,013,887 A | 1/2000 | Satake et al. | |
| 6,100,526 A | 8/2000 | Mayes | |
| 7,016,043 B2 | 3/2006 | Fukumori et al. | |
| 7,202,434 B2 | 4/2007 | Löfqvist et al. | |
| 7,417,203 B2 * | 8/2008 | Lofquist | B07C 5/365 |
| | | | 209/44.2 |
| 7,718,912 B2 * | 5/2010 | Akimoto | G01N 21/956 |
| | | | 209/576 |
| 7,858,893 B1 | 12/2010 | Haff et al. | |
| 8,045,168 B2 | 10/2011 | Missotten et al. | |
| 8,985,342 B2 * | 3/2015 | Tanaka | B07C 5/3425 |
| | | | 209/639 |
| 2003/0072484 A1 | 4/2003 | Kokko et al. | |
| 2004/0055211 A1 | 3/2004 | Lestander et al. | |
| 2006/0064780 A1 | 3/2006 | Munck et al. | |
| 2013/0168301 A1 | 7/2013 | Dell'Endice | |
| 2015/0371400 A1 | 12/2015 | Farsiu et al. | |
| 2017/0001220 A1 | 1/2017 | Arlinghaus et al. | |

OTHER PUBLICATIONS

Allred et al., "The Use of Visual Examination for Determining the Presence of Gluten-Containing Grains in Gluten Free Oats and Other Grains, Seeds, Beans, Pulses, and Legumes", Journal of AOAC International, vol. 101, No. 1, pp. 36-44, 2018.

* cited by examiner

METHOD OF PRODUCING GLUTEN FREE OATS THROUGH HYPERSPECTRAL IMAGING

BACKGROUND OF THE INVENTION

In general, the invention is concerned with grain classification techniques and, more particularly, with methods to sort grains in order to produce gluten free oats.

Sensitivity to gluten is estimated at afflicting up to 2% of the population. In fact, based on the increased awareness of Celiac disease and gluten intolerance, gluten levels in certain foods can be a limiting factor in consumption. Oats themselves do not contain gluten. However, oats cultivated in North America, Europe and even other parts of the world are commonly contaminated by gluten containing foreign grains, including wheat, barley, rye and triticale. This contamination is commonly known to come from various sources, mainly from the rotation of small grain crops on the same land, with residual contaminating seeds germinating with a seeded oat crop. In addition, contamination from other grains which are harvested, transported, stored and merchandized in common with oats is a contributing factor. As a result, it is not uncommon to find from 0.1% to 1.0% of these other grains mixed with commercially marketed oats. Therefore, absent dedicating land, harvesting equipment, transporting vehicles, storage units, packaging and production facilities, and the like only for use in connection with oats, cross contamination is inevitable.

The U.S. federal government has established rules for labeling products "gluten-free", with the American regulations correlating to the Codex rules established in Europe which stipulate a maximum of 20 ppm gluten in "gluten-free" food products. Based on rules from the United States Food and Drug Administration, oats are eligible for gluten-free labeling as long as they are substantially free of foreign seeds. With this in mind, separating commodity oats from foreign grains and other contaminants is required if oat products are to be produced to mandated gluten levels.

Known grain sorting techniques typically rely on mechanical or optical systems. Mechanical systems are considered advantageous generally based on their simplicity and cost benefits. Optical systems generally employ multiple cameras to view grain falling toward a grain rejection mechanism. In some machines, duplicate optical units are positioned on opposite sides of a sorter to provide simultaneous images of opposing sides of the grains. In general, optical sorters have higher associated costs and, although effective to a significant degree, still do not enable achieving the reduced gluten levels desired in accordance with the invention.

Certainly, the most difficult contamination grain to separate from the oats is barley. More specifically, even though the average shape of a typical barley grain is fairly distinct from that of an average oat grain, in a large load of grain, there is a significant variance in the size and shape of both the oats and barleys. Although optical separators have proven advantageous under certain circumstances, optical sorting using visible light is not sufficiently accurate for distinguishing oats from barley. Sorting based on one or two infrared frequency bands is also of limited effectiveness for sorting oats and barley. These separations are especially difficult when the hull of the oat is still intact. Therefore, there is seen to exist a need to provide a method, which can be used, either alone or in combination with one or more mechanical or optical sorting systems, for effectively and efficiently decontaminating oat grains in order to produce a high yield of gluten-free oats useable for various purposes, particularly as an oat ingredient in the production of various food products, including cereal and granola.

SUMMARY OF THE INVENTION

In a broad sense, the invention is directed to establishing a supply of gluten-free oats, defined for purposes of the invention to be an oat supply having gluten levels below 20 ppm and, more preferably, no greater than 10 ppm, by removing foreign grains from the oats. The invention can actually be employed in connection with the main identifying and separating of common contaminants (particularly wheat, barley, rye, and triticale) from a supply of oats or, in accordance with a preferred arrangement, used in connection with quality control sampling of oat supplies which have already been separated from contaminate grains, such as through the use of known mechanical and/or optical sorting systems. In either case, the invention is directed to improving foreign material removal (particularly barley) from the oats in the preparation of gluten-free oats by employing an optical classification system for identifying contaminates. At least in connection with quality control sampling, particular to the invention is the separation of barley from the oats through hyperspectral imaging. Most important in connection with the invention is seed or grain classification using hyperspectral digital imaging and the evaluation of pixels in the digital images of only a particular region of interest for each grain. That is, in accordance with the invention, only pixels within central regions of the grains are evaluated for classification purposes, thereby excluding the peripheral edge regions and particularly the tips of the grains.

Additional objects, features and advantages of the present invention will become more readily apparent from the following detailed description of the invention with reference to the drawings.

DETAILED DESCRIPTION OF THE INVENTION

In connection with removing foreign grains from oats to ensure gluten levels below 20 ppm, and preferably below 10 ppm, the invention employs optical sorting and, more specifically, optical sorting through hyperspectral imaging. Although the invention could be readily employed to remove a wide range of contaminant grains from a supply of oats in establishing a supply of gluten-free oats, the invention is preferably used in combination with, specifically downstream of, one or more other known mechanical or optical sorting systems in order to check for and/or remove additional contaminant grains from a pre-sorted supply of oats. By way of example, the invention can be employed with one or more of the mechanical and optical sorting systems disclosed in U.S. Pat. Nos. 9,463,493, 9,700,919 and 9,862,004 and U.S. patent application Ser. No. 15/265,392, all of which are hereby incorporated by reference. With this in mind, the invention has particular application in connection with quality control sampling of pre-sorted oat supplies. In any case, the invention is considered to be particularly beneficial in connection with identifying and removing barleys (the most difficult of the contaminate grains to remove with known mechanical and optical sorting systems) from such a supply of oats in order to even further reduce the gluten level of the supply of oats.

Figure 1:
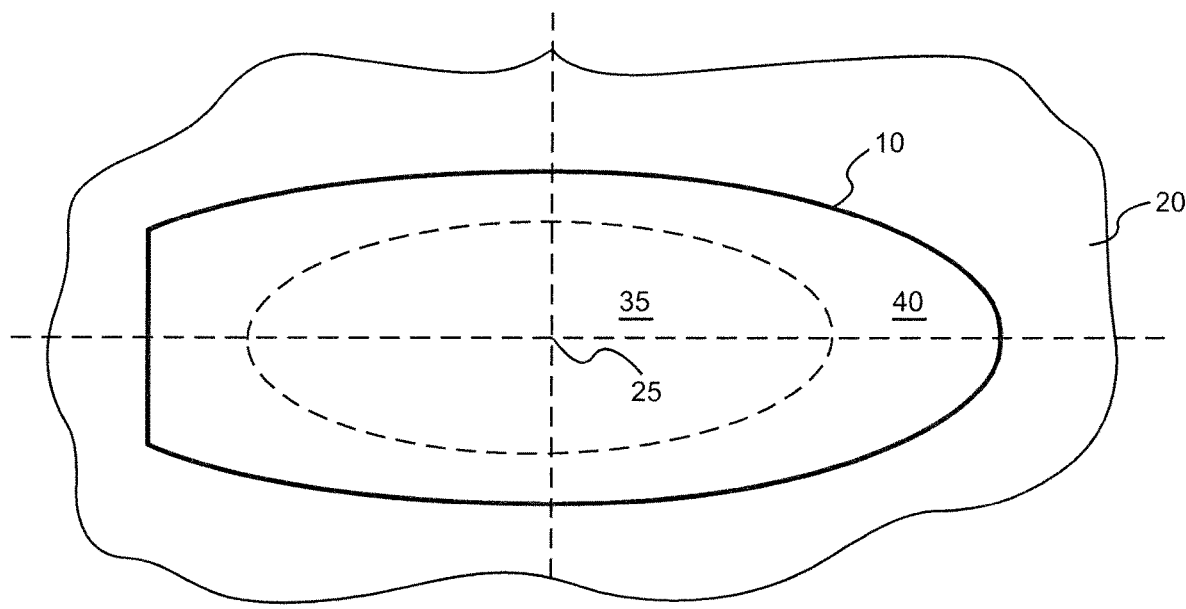
FIG. 1 illustrates an image of an oat grain labeled in accordance with the invention.
Figure 2:
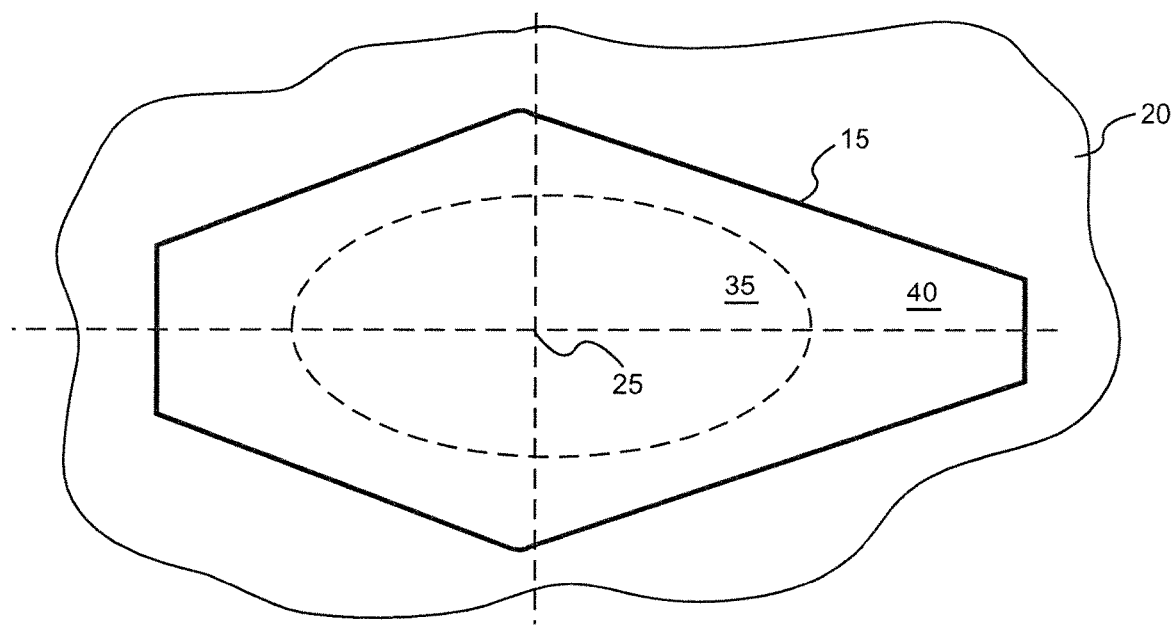
FIG. 2 illustrates an image of a barley grain labeled in accordance with the invention.

For purposes in detailing the invention, reference will be made to further classifying a supply of oats which includes some barley. In general, the components of the optical system employed, as well as the common types of classification algorithms, are known and therefore not considered part of the invention. Instead, it is the type and manner of processing of the data sent into the classification algorithms to which the present invention is particularly directed. In FIGS. 1 and 2, images of a typical oat grain 10 and a typical barley grain 15, each shown supported upon a conveyor belt or other supporting surface 20 but which also could be supported in other fashions or even free-falling, are presented, respectively. As can be seen, the overall shape of grains 10 and 15 are generally analogous which can create a problem with known mechanical or optical sorting techniques. However, in accordance with the invention, hyperspectral imaging is employed and analysis is made on only a particular region of interest of each grain in the supply of grains. In accordance with the most preferred embodiments of the invention, a center or centroid 25 of each grain 10, 15 is established, such as by crossing major axes of the grains, and then imaging analysis is only performed to a certain space or area around centroid 25. That is, a central region 35 from the centroid 25 is established and only pixels from the imaging in this central region 35 is utilized for grain classification purposes. By way of example, the middle 50% of the grain 10, 15 can be relied upon, thereby excluding an entire peripheral edge region 40 of each grain 10, 15. In this way, the tips of the grains are definitely excluded. For purposes of the invention overall, at least the outer 25% of the grain image is to be ignored in order to assure that the tips and other outermost peripheral edge regions of the grains are not relied upon in the classification analysis. Under these conditions, the barley grains 15 can be effectively distinguished from the oat grains 10 for classification purposes, enabling the overall supply of oats to have a gluten level below 20 ppm and, more preferably, no greater than 10 ppm.

For the sake of completeness, a particular embodiment of the invention which was evaluated in detail will now be described. For purposes of this embodiment, a Specim SWIR hyperspectral line scan camera with a spatial resolution of approximately 64 pixels per inch was utilized. Lighting was supplied by direct halogen illumination. Data was collected in wavelengths ranging from 1000 to 2500 nm. Dead pixels were replaced with the mean value of the adjacent wavelengths for the same physical location. Images were preprocessed with both a white/dark reference at each wavelength and anti-scattering transforms were applied, such as a standard normal variant transform across the entire spectra. The overall average intensity of each pixel after white/dark normalization was saved as a separate value for use in segmentation.

A white/dark normalization was performed by collected several hundred-line scans with the lens cap on. The white reference was achieved by moving a PTFE sheet under the camera and creating an average response for each of the 640 spatial pixels at each of the wavelengths. White/dark correction for each wavelength was then calculated as:

$$I_{WD,x,n} = \frac{(I_{x,n} - W_{x,n})}{(W_{x,n} - D_{x,n})}$$

where
$I_{x,n}$=intensity observed at physical location x and wavelength n
$W_{x,n}$=white reference intensity at location x and wavelength n
$D_{x,n}$=dark reference intensity at location x and wavelength n To collect the images, seeds were placed on a blue polymer belt and moved under the camera via a stepper motor controlled by the camera data acquisition software. After white/dark correction, shadowed and overly reflective pixels were eliminated by discarding ones with average intensities less than 0.15 or more than 0.55. To segment the seed from the belt, spectral intensities between 1140 and 1297 nm were used as follows:

Segmentation parameter=(1.1516−average from 1140 to 1297)/1.56

Here, the segmentation parameter is close to zero for pixels near the center of seeds and close to 1 for the belt material. The seeds are semi-translucent, so pixels near the edge had noticeable bleed through of reflectance from the belt. To eliminate this, only pixels with a segmentation value less than 0.2 were kept.

After the above processes were performed, the remaining pixels constituted the grain or seed image. When using a linear discriminant classifier, the training set can either be the average of the spectra for each seed or all the individual pixels in the seed. In the first case, the seed would be classified based on its average spectra. In the latter case, the seed could be classified either by the numerical average of the LDA outputs, or by a voting scheme that uses most of the individually classified pixels as the overall seed class.

As indicated above, particularly important to the invention is the use of imaging of only a particular region of interest of each grain in the supply of grains. In connection therewith, the centroid of the seed was found and only pixels close to the centroid were for the classification. In this case, kernels from 5×5 to 9×9 were used. The seed was then classified by using the voting method on the classification of each of the 25-81 pixels.

Figure 3:
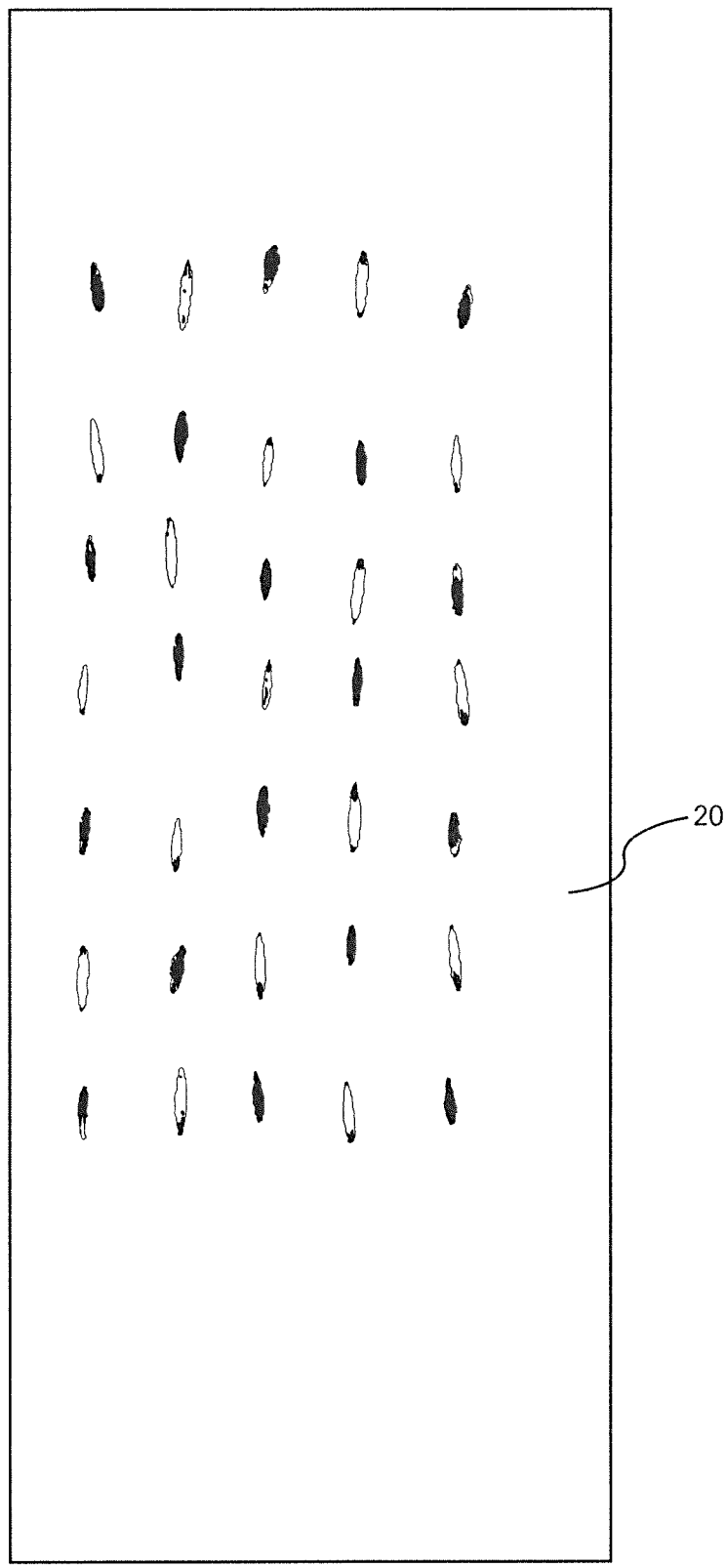
FIG. 3 is an image illustrating grain classification analysis performed in accordance with the invention.

In connection with this testing method, FIG. 3 shows a false color image of oats and barley classified using LDA on all seed pixels. The image shows alternating barley and oats imaged under identical lighting conditions. The first seed in the upper left corner is a barley and the seeds alternate between barley and oats across each row and column. Dark areas show pixels classified as barley and light or white is for pixels classified as oats. Although each seed may be correctly classified using the average of all the pixels, it is clear that the individual misclassified pixels are near the ends of the seeds. Of course, the seeds are best sorted when they are not touching each other. In any case, the tips and other peripheral regions reduce the classifier performance or, in other words, higher classification accuracy was achieved when only imaging data from the center portions of the grains was relied upon.

With the above in mind, it should be understood that the image analysis in accordance with the invention is limited to just a particular central portion or region of each grain. If considering the identification of a contaminant grain, particularly a barley grain, as a positive, there will certainly be false positives, i.e., some oat grains will be de-sorted along with the barley grains from the supply of grains. As the classification scheme will favor the de-sorting of oats with the barley over missing the removal of a barley grain, it is actually the case that more oats will be removed than barley. However, this still results in the resulting grain supply being closer to a pure oat supply. In addition, through recycling, the rejected grains can be re-scanned to reduce losses at the expense of total system throughput. In any case, based on the above, it should be readily apparent that focusing on the central portion of the grains for image classification purposes is highly beneficial for sorting. Also, as mentioned above, the invention has particular application in connection with quality control sampling of a supply or stream of oats established by separating a supply of grains including oats and at least one contaminant grain wherein, in accordance with the invention, a sample would be withdrawn from the supply of oats and optically analyzed through hyperspectral imaging of a particular region of interest for each grain analyzed to verify a gluten level below 20 ppm. In any case, although described with reference to preferred embodiments and aspects of the invention, it should be understood that various changes and/or modifications to the invention can be made without departing from the spirit of the invention.

I claim:

1. A method of producing gluten-free oats from a supply of grains including oats and at least one contaminant grain comprising:
    optically analyzing the supply of grains through hyperspectral imaging wherein, for each grain, a particular region of interest spaced away from at least some edge portions of the grain is identified; and
    separating the oats from the at least one contaminant grain to establish a supply of oats having a gluten level below 20 ppm based on the optical analysis of only the particular region of interest.

2. The method of claim 1, wherein the optically analyzing includes locating a centroid of the grain and collecting data of the grain from only pixels in a predetermined spacing from the centroid.

3. The method of claim 2, wherein the predetermined spacing excludes a peripheral edge region of the grain.

4. The method of claim 2, wherein the predetermined spacing excludes a tip of the grain.

5. The method of claim 1, wherein the hyperspectral imaging is performed with a spatial resolution of approximately 64 pixels per inch.

6. The method of claim 1, further comprising: performing the hyperspectral imaging only in wavelengths ranging from 1000 to 2500 nm.

7. The method of claim 6, wherein the wavelengths only range from 1000 to 1700 nm.

8. The method of claim 1, wherein the supply of grains constitutes a pre-sorted supply of oats and the at least one contaminant grain is barley.

9. The method of claim 1, further comprising: performing the hyperspectral imaging while the supply of grains is supported on a conveyor belt.

10. The method of claim 1, wherein the optically analyzing includes segmenting the grains by only analyzing pixels with a segmentation value less than 0.2.

11. The method of claim 1, wherein separating the oats from the combination of grains results in oats with a gluten level of no greater than 10 ppm.

12. The method of claim 1, wherein the method is performed on a quality control sampling of a pre-sorted supply of gluten-free oats.

13. A method of producing gluten-free oats from a supply of grains including oats and at least one contaminant grain comprising:
    obtaining hyperspectral optical imaging of the supply of grains;
    analyzing optical data from the hyperspectral optical imaging from only a particular region of interest of each grain in the supply of grains; and
    separating the oats from the at least one contaminant grain to establish a supply of oats having a gluten level below 20 ppm based on the analysis of the optical data.

14. The method of claim 13, wherein analyzing the optical data includes locating a centroid of the grain and analyzing data of the grain from only pixels in a predetermined spacing from the centroid.

15. The method of claim 14, wherein the predetermined spacing excludes a peripheral edge region of the grain.

16. The method of claim 14, wherein the predetermined spacing excludes a tip of the grain.

17. The method of claim 13, wherein the hyperspectral optical imaging has a spatial resolution of approximately 64 pixels per inch.

18. The method of claim 13, wherein the hyperspectral optical imaging is obtained only in wavelengths ranging from 1000 to 2500 nm.

19. The method of claim 18, wherein the wavelengths only range from 1000 to 1700 nm.

20. The method of claim 13, wherein the supply of grains constitutes a pre-sorted supply of oats and the at least one contaminant grain is barley.

21. A method of producing gluten-free oats comprising:
    separating a supply of grains including oats and at least one contaminant grain to establish a supply of oats; and
    sampling the supply of oats by:
        withdrawing a sample from the supply of oats; and
        optically analyzing the sample through hyperspectral imaging of a particular region of interest for each grain analyzed, with the particular region of interest being spaced away from at least some edge portions of the grain, to verify a gluten level below 20 ppm.

22. The method of claim 21, wherein the optically analyzing includes locating a centroid of the grain and collecting data of the grain from only pixels in a predetermined spacing from the centroid.

23. The method of claim 22, wherein the predetermined spacing excludes a peripheral edge region of the grain.

24. The method of claim 22, wherein the predetermined spacing excludes a tip of the grain.

* * * * *